United States Patent [19]

Schöttker

[11] Patent Number: 4,573,739

[45] Date of Patent: Mar. 4, 1986

[54] HINGE STRUCTURE FOR SEAT WITH ADJUSTABLE BACKREST

[75] Inventor: Willi Schöttker, Nordsehl, Fed. Rep. of Germany

[73] Assignee: P. A. Rentrop, Hubbert & Wagner Fahrzeugausstatungen GmbH & Co. KG, Stadthagen, Fed. Rep. of Germany

[21] Appl. No.: 552,560

[22] Filed: Nov. 16, 1983

[30] Foreign Application Priority Data

Dec. 1, 1982 [DE] Fed. Rep. of Germany ....... 3244399

[51] Int. Cl.⁴ .................... A47C 1/024; B21K 1/30
[52] U.S. Cl. .................... 297/362; 29/159.2; 74/804
[58] Field of Search .............. 297/362, 355, 361; 16/354; 29/159.2, 11; 74/460, 804, 805

[56] References Cited

U.S. PATENT DOCUMENTS 4,275,924 6/1981 Lehmann et al. .......... 29/159.2 X
4,469,376 9/1984 Pelz .................... 297/362

FOREIGN PATENT DOCUMENTS 2807516 8/1979 Fed. Rep. of Germany ..... 29/159.2

*Primary Examiner*—William E. Lyddane
*Assistant Examiner*—Peter R. Brown
*Attorney, Agent, or Firm*—Pollock, Vande Sande & Priddy

[57] ABSTRACT

Hinge structures are disclosed which are useful in seats with adjustable backrests, the structures including a gear unit (6, 8) in which indented and protruding tooth systems (6a, 8a) are punched into the hinge pieces using the precision blanking process, the diameter as well as the tooth contour of the protruding tooth system (8a) being at least partially smaller than the diameter and the tooth contour of the associated indented tooth system (6a) so that material can then flow from the unused tooth system produced during precision blanking and into the effective tooth system, thus enlarging the tooth width (b) of the effective tooth system to be greater than the thickness (d) of the initial material. See FIGS. 4a and 5a.

2 Claims, 15 Drawing Figures

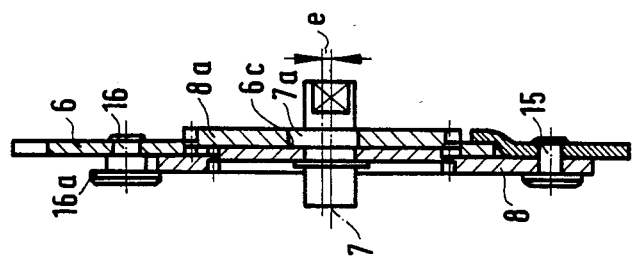
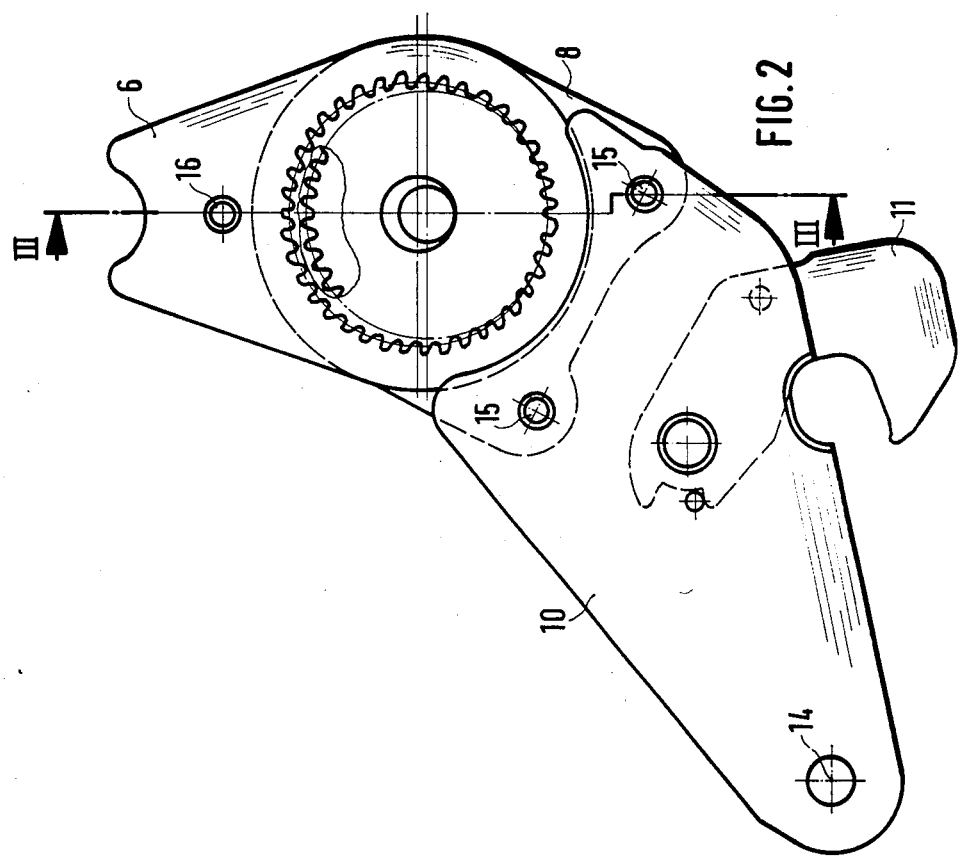

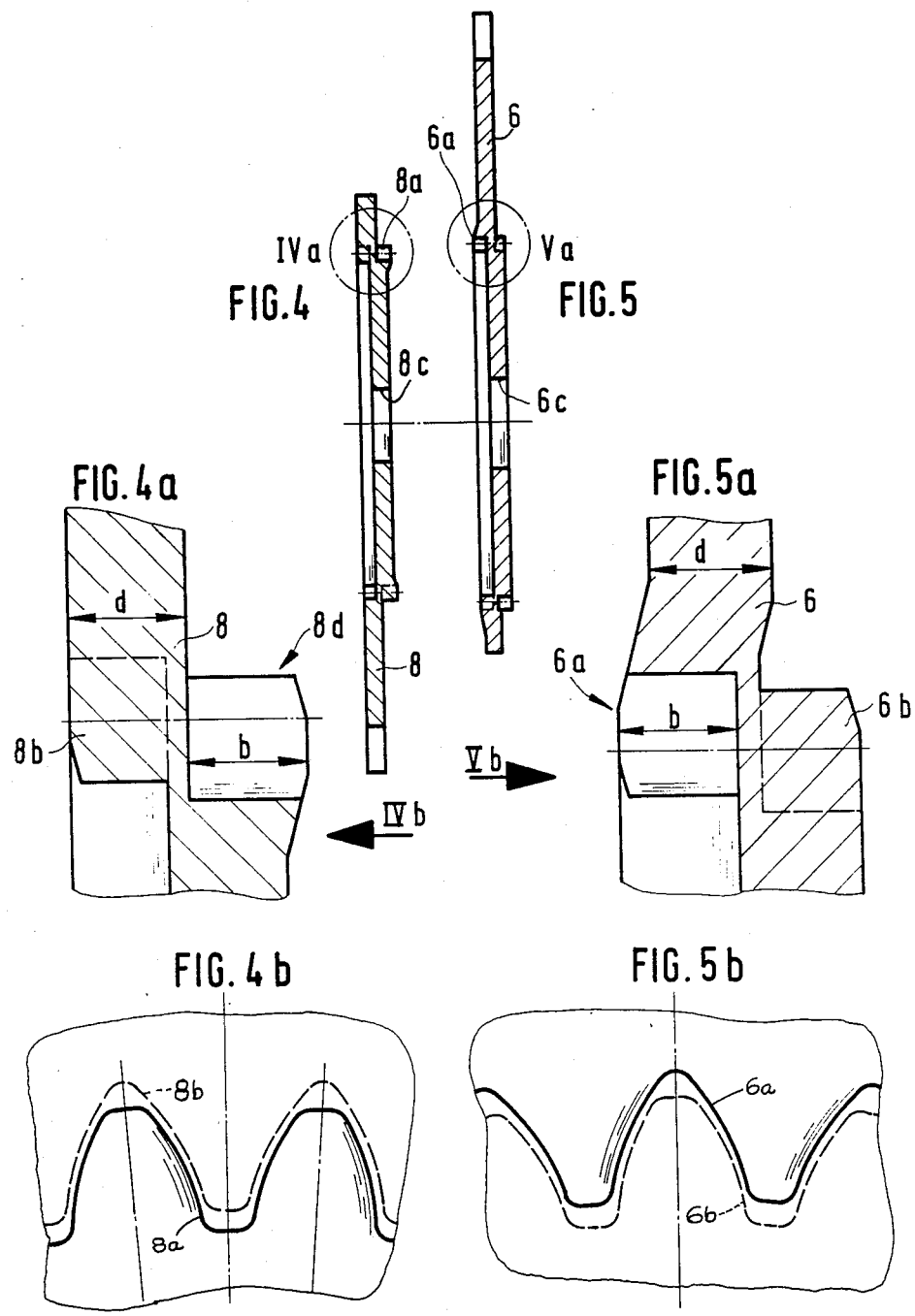

HINGE STRUCTURE FOR SEAT WITH ADJUSTABLE BACKREST

DESCRIPTION

1. Reference to a Related Application

This application is related to commonly assigned U.S. Ser. No. 511,132 filed July 6, 1983, by Ernst Wahlmann for Hinge Structure for Seat with Adjustable Backrest.

2. Technical Field

The invention concerns a hinge structure for seats with adjustable backrests, such as motor vehicle seats, in which a stationary hinge piece attaced to the seat and a movable hinge piece attached to the backrest are connected on a pivot axle having an eccentric portion. One hinge piece has inwardly projecting gear teeth into which extend the outwardly projecting teeth of a spur gear on the other hinge piece, thereby forming a wobble-plate gear unit. The spur gear is designed as a protrusion from the other hinge piece. Bearing openings to accept the pivot axle and its eccentric portion are provided in the central bridging areas of the toothed portions of the two hinge pieces.

3. Background Art

Such hinge structures with wobble-plate gear units are known in various designs. In one of the first known structures of this type, the spur gear of the wobble-plate gear unit was molded onto the other hinge piece as shown in German Patent Specification No. 16 80 128. When the pivot axle with eccentric portion is turned to adjust the tilt of the backrest, the backrest drifts by the amount of eccentricity.

In another hinge structure of the above-mentioned type, the spur gear is placed loosely on the eccentric portion of a pivot axle which is situated in aligned holes in the two hinge pieces. This known spur gear has a double tooth system with two different diameters of teeth arranged concentrically with but axially spaced from one another. The first tooth system mates with an inwardly projecting tooth system of the first hinge piece and the second tooth system mates with an inwardly projecting tooth system of the second hinge piece.

All known hinge structures of the types just described have the serious disadvantage that the width of the effective tooth system may not drop below a minimum if the rotating movement and the stresses are to be transmitted from one hinge piece to the other. This applies to designs which have a separate double spur gear which rotates on an eccentric, and to designs in which the spur gear is connected to one of the two hinge pieces.

In the design shown in German Patent Specification No. 16 80 128, a one-part, molded spur gear is used, the back side of the bridging area of the molded spur gear being located in a plane which is some distance behind the plane of the front side of the adjacent area of the associated hinge piece. This means that the effective width of the protruding spur gear teeth is less than the thickness of the initial material used for the associated hinge piece. In this known device, the connection of the protruding spur gear to the hinge piece is accomplished via a circumferentially and axially extending wall bridge which joins in one piece the protruding spur gear and the hinge piece. This wall bridge is produced because the spur gear is not pressed out of the hinge piece by its full material thickness. Two tooth systems are produced which are identical in diameter, tooth form and tooth countour, one inwardly projecting tooth system pressed into the back side of the hinge piece and one outwardly projecting tooth system pressed from the front side of the hinge piece. The tooth spaces of the outwardly projecting tooth system are thus opposed in an axial direction by the teeth of the inwardly projecting tooth system. The material thickness of the hinge piece in this known solution comprises the axial tooth width plus the axial thickness of the wall bridge.

In an attempt to make the hinge pieces as thin-walled as possible, it has also been proposed in German Laid-Open Specification No. 28 34 492 that the backsides of the protruding spur gears be arranged in one plane with the front sides of the associated hinge pieces. In this case, the necessary wall bridges between the protruding spur gears and the hinge pieces comprise axially extended material zones adjacent to the tooth spaces of the inwardly projecting teeth and the outwardly projecting teeth. If such a structure is used, it is possible for the effective tooth width to be the same as the thickness of the initial material used for the hinge pieces.

DISCLOSURE OF THE INVENTION

Based on the state of the art technology discussed above, an object of the present invention is to provide an improved hinge structure in which the tooth width is greater than the thickness of the initial material.

This object is achieved in accordance with the invention by virtue of the fact that both the diameter and the tooth contour of the protruding tooth system are at least partially and preferably entirely smaller than the diameter and the tooth contour of the associated indented tooth system, such that the tooth width of the given effective tooth system is greater than the thickness of the initial material.

The tooth systems on hinge structures of the types assumed to be known are generally produced using a punch process known as precision blanking. By configuring the male and female molds appropriately, the displaced, excess material from the unnecessary, ineffective tooth system area can flow into the effective, opposite tooth system area, as will be understood by those skilled in the art.

The hinge structure in accordance with the invention for the first time makes it possible to produce a tooth area with a width which is greater than the thickness of the initial material. This is a significant improvement in comparison to the current state of the art technology, because the required tooth width of the effective tooth system has previously been the most decisive factor used in determining the thickness of the initial material, while maintaining a predetermined tooth width. As a result, both cost and weight savings can be achieved in comparison to the known solutions.

In one preferred design form of the invention, the spur wheel area is joined in one piece with the associated hinge piece and the tooth width of the spur wheel area is greater than the thickness of the initial material used for the associated hinge piece. Finally, in accordance with the invention the diameter and the tooth contour of the protruding tooth system are at least partially smaller than the diameter and the tooth contour of the associated, indented tooth system. Such a design form results in a circumferential connector between the protrusion and the hinge piece so that the protrusion cannot shear off the hinge piece, even under very severe stress.

BRIEF DESCRIPTION OF THE DRAWINGS

Preferred design forms of the invention will be described in detail in the following on the basis of the attached drawings, in which:

FIG. 2 shows a side view, partially broken away, of the hinge structure;

FIG. 3 shows a section along plane III—III of FIG. 2;

FIG. 4 shows a lengthwise section through the one hinge piece;

FIG. 4a shows an enlarged detail of the area at IVa of FIG. 4;

FIG. 4b shows a view of an area of FIG. 4a in the direction of the arrow IVb;

FIG. 5 shows a lengthwise section through the other hinge piece;

FIG. 5a shows an enlarged detail of the area at Va of FIG. 5;

FIG. 5b shows a view of an area of FIG. 5a in the direction of the arrow V;

BEST MODE FOR CARRYING OUT THE INVENTION

Figure 1:
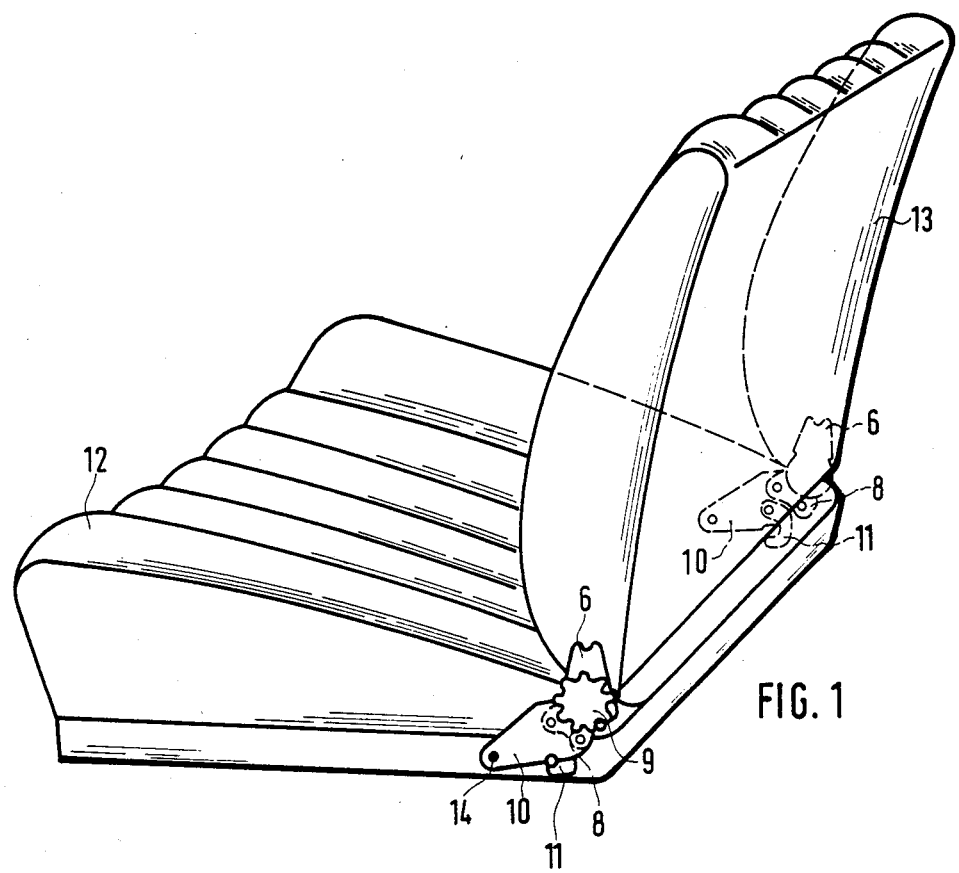
FIG. 1 shows a perspective view of a vehicle seat with the hinge structure in accordance with the invention.

A backrest 13 is hinged to a vehicle seat 12. A first hinge piece 6 is fastened to the backrest and a second hinge piece 8 is immovably attached to the vehicle seat 12. The second hinge piece 8 is fastened in a fitting piece 10 which can be rotated to move the backrest forward around a pivot axis 14. The backrest is locked in place with the help of a catch 11.

A hand wheel 9 is immovably attached to a pivot axle 7 which is situated in a central hole 8c through the second hinge piece 8 such that it can rotate. The pivot axle 7 has an eccentric portion 7a which is located in a central hole 6c through the first hinge piece 6.

The second hinge piece 8 has an outwardly projecting spur wheel tooth system 8a which projects to the right according to FIG. 3 and which is arranged concentrically with respect to the pivot axle 7. The spur wheel tooth system 8a is meshed with an inwardly projecting tooth system 6a of the first hinge piece 6. The crown line of the spur wheel tooth system 8a is at least one tooth height smaller in diameter than the root line of the associated inwardly projecting tooth system 6a. The eccentricity e of the eccentric portion 7a corresponds approximately to the difference between the root line of the inwardly projecting tooth system 6a and the crown line of the spur wheel tooth system 8a. This different in diameters is chosen so that self-locking is assured between the inwardly projecting tooth system 6a and the spur wheel tooth system 8a.

The fitting part 10 is connected to the second hinge piece 8 by two rivets 18. A rivet 16 is also immovably connected to the first hinge piece 6 and its enlarged head 16a overlaps the rounded edge at the top of the second hinge piece 8, as shown in FIG. 3. The head 16a allows the two hinge pieces to turn relative to one another while also holding them in proper axial engagement. When the hand wheel 9 is turned, the pivot axle 7 with the eccentric portion 7a rotates horizontally and the stationary spur wheel tooth system 8 meshes with the associated inwardly projecting tooth system 6a during rotation.

The inwardly projecting tooth system of the first hinge piece 6 and the spur gear tooth system of the second hinge piece 8 are produced by a punch process known as precision blanking. In the case of the second hinge piece 8 shown in FIGS. 4 and 4a, the effective spur wheel tooth system 8a is the protruding area on the right side, while an ineffective inwardly projecting tooth system 8b is located on the left side according to FIG. 4 and 4a. The protruding tooth system 8a corresponds only approximately to the image of the indented tooth system 8b, with the restriction that there is a tooth in the system 8b just axially opposite the place where there is a tooth space on the system 8a. The diameter and the tooth contour of the tooth system 8a are smaller than the diameter and the tooth contour of the associated tooth system 8b, as shown in FIG. 4b. As a result, an excess amount of material flows into the area of the effective tooth system 8a on the second hinge 8 so that the tooth width b can be greater than the thickness d of the initial material.

Similarly, the tooth contour and diameter of the ineffective protruding tooth system 6b on the associated first hinge piece 6 are also smaller than the tooth contour and the diameter of the effective indented tooth system 6a, as shown in FIG. 5b. The only difference is that the tooth system 6a is the effective tooth system area, while the tooth system area 6b is ineffective tooth system. The tooth contour of the protruding tooth system 8a or 6b according to the design examples shown in FIGS. 4 to 5b is smaller in circumference than the tooth contour of the associated indented tooth system area 8b or 6a.

Figures 6, 7:
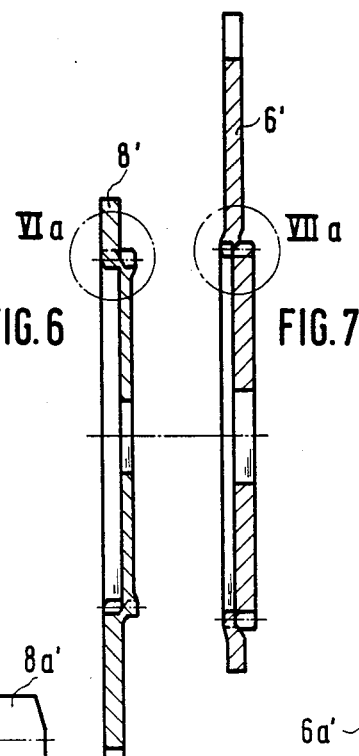
FIG. 6 shows a lengthwise section through a second design form of the one hinge piece.
FIG. 7 shows a lengthwise section through a second design form of the other hinge piece.
Figure 6A:
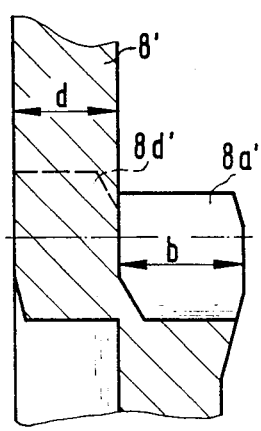
FIG. 6a shows an enlarged detail of the area VIa of FIG. 6.
Figure 7A:
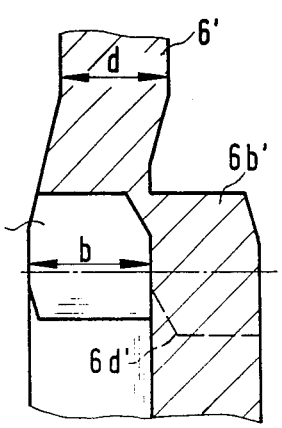
FIG. 7a shows an enlarged detail of the are VIIa of FIG; 7.
Figure 6B:
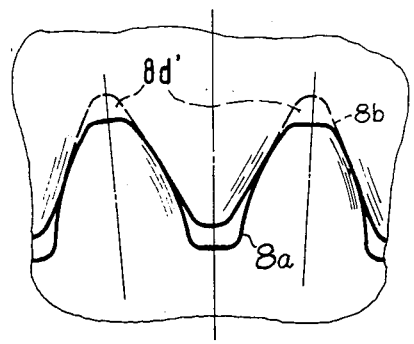
FIG. 6b shows a view of an area of FIG. 6a in the direction of the arrow VIb.
Figure 7B:
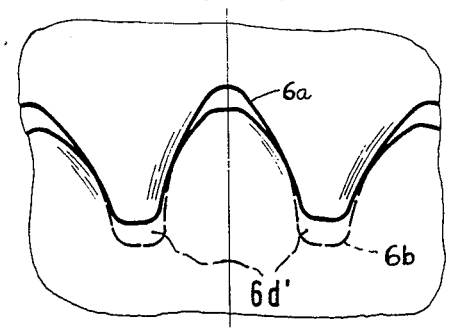
FIG. 7b shows a view of an area of FIG. 7a in the direction of the arrow VIIb.

The design form according to FIGS. 6 to 7b shows a solution in which both the diameter and the tooth contour of the protruding tooth system are at least partially smaller than the diameter and the tooth contour of the associated indented tooth system. In the embodiment of FIGS. 6 to 7b, the entire connection area of the tooth systems to the hinge pieces is confined instead only to partial areas of the tooth system such as the tooth tips 8d'. That is, the protruding and indented tooth systems have the nearly same contours at least in some places, but have different diameters. See FIGS. 6b and 7b. This configuration results in a weaker joining of the tooth area 8a' to the second hinge piece 8'.

An analogous design is used for the first hinge piece 6'. Once again, the tooth contour and the diameter of the protruding, ineffective tooth system 6b' are not smaller in all locations than the tooth contour and the diameter of the associated indented tooth system 6a'. As a result, the joining of the protruding tooth system takes place primarily in the teeth roots over the area 6d'. With this construction as well, the connection between the protruding tooth system 6b' and the first hinge piece 6' is weaker than it is in the design form shown in FIGS. 5a and 5b. The tooth width b with all of the design forms shown is greater than the thickness d of the initial material.

Regardless of the actual construction used, the term "protruding" in the present invention refers to that tooth system which projects beyond the adjacent areas of the associated hinge piece. The term "indented" refers to that tooth system which is situated in a recess of the associated hinge piece.

Having described my invention is sufficient detail to enable those skilled in the art to make and use it, I claim:

1. An improved hinge structure for use with seats having a stationary seat portion and a pivotable backrest, said hinge structure comprising:

a first hinge piece made from a starting material of a given initial thickness, said first hinge piece having a first outwardly projecting spur gear tooth system protruding from one side thereof and a first inwardly projecting tooth system indented on the other side thereof, said first tooth systems being concentric and the diameter of said protruding tooth system being smaller than that of said indented tooth system, and tooth contour of said protruding tooth being smaller over a portion thereof than that of a corresponding portion of said indented tooth system, wherein the effective width of the teeth of said protruding system is greater than said initial thickness; said first hinge piece also having a first central hole concentric with said first tooth systems;

a second hinge piece made from a starting material of a given initial thickness, said second hinge piece having a second outwardly projecting spur gear tooth system protruding from one side thereof and a second inwardly projecting tooth system indented on the other side thereof said second tooth systems being concentric and the diameter of said protruding tooth system being smaller than that of said second indented tooth system and tooth contour of said protruding tooth being smaller over a portion thereof than that of a corresponding portion of said second indented tooth system, wherein the effective width of the tooth of said indented system is greater than said initial thickness; said second hinge piece also having a second central hole concentric with said second tooth systems; and a pivot axle having an eccentric portion, said axle pivotably joining said hinge pieces with said first protruding tooth system extending into said second indented tooth system and with said eccentric portion rotatably extending into one of said first and second holes, whereby rotation of said pivot axle causes relative movement between said first protruding tooth system and said second indented tooth system.

2. A hinge structure according to claim 1, wherein the remaining portions of said tooth contours of said protruding tooth systems are smaller than the remaining portions of tooth contours of said indented tooth systems.

* * * * *